United States Patent
Atkin

(10) Patent No.: US 6,883,007 B2
(45) Date of Patent: Apr. 19, 2005

(54) META NORMALIZATION FOR TEXT

(75) Inventor: Steven Edward Atkin, Austin, TX (US)

(73) Assignee: International Business Machines, Armonk, NY (US)

( * ) Notice: Subject to any disclaimer, the term of this patent is extended or adjusted under 35 U.S.C. 154(b) by 554 days.

(21) Appl. No.: 09/931,302

(22) Filed: Aug. 16, 2001

(65) Prior Publication Data

US 2003/0046257 A1 Mar. 6, 2003

(51) Int. Cl.[7] ............ G06F 17/30; G06F 17/00
(52) U.S. Cl. ............................................. 707/101
(58) Field of Search ................. 707/1–10, 100, 707/101, 104.1, 200; 715/500.1; 717/100; 382/181

(56) References Cited

U.S. PATENT DOCUMENTS

| | | | | |
|---|---|---|---|---|
| 5,883,986 A | * | 3/1999 | Kopec et al. | 382/310 |
| 6,055,365 A | * | 4/2000 | Tye | 716/1 |
| 6,438,516 B1 | * | 8/2002 | Davis | 704/8 |
| 6,611,845 B1 | * | 8/2003 | Dockter et al. | 707/104.1 |

OTHER PUBLICATIONS

Mark E Davis, Feb. 25, 1999, Draft Unicode Technical Report #, Unicode Normalization Forms, Revision 11, http://www.unicode.org/unicode/reports/tr15/tr15–11.html.*

* cited by examiner

Primary Examiner—Safet Metjahic
Assistant Examiner—Marc R Filipczyk
(74) Attorney, Agent, or Firm—Robert H. Frantz; Mark S. Walker; Cynthia S. Byrd

(57) ABSTRACT

A system and method for normalizing encoded text data such as Unicode which is extensible without use of character definition tables through the use of metadata tagging. First, metadata characters, which have no effect on the interpretation of the raw text data, are used to express higher order protocols of encoded two text strings. Next, meta normal form conversion is performed on one or both of two strings to be compared, if both strings are not already in the same meta normal form. Finally, content equivalence determination is performed in which the characters in each string are compared to each other. If a string contains a metadata character, that character is ignored for purposes of equivalence comparison. The remaining characters represent the pure content of the string, e.g. characters without any particular glyph representation.

12 Claims, 7 Drawing Sheets

*Prior Art*

*Prior Art*

*Prior Art*

*Prior Art*

*Prior Art*

81 —⌒f   UFB01

*Prior Art*

91 —⌒ UFB02,UFF41,UFF4D,UFF42,U00E9

92 —⌒ UFB02,UFF41,UFF4D,UFF42,U0065,U0301

*Prior Art*

101 —⌒ UFB02,U0061,U006D,U0062,U00E9

102 —⌒ UFB02,U0061,U006D,U0062,U0065,U0301

Figure 10

*Prior Art*

1202 ~ [ELM]=[VER]?!~[ELM]

1203 ~ [ELM]=[WID]?!~[ELM]

Figure 12

META NORMALIZATION FOR TEXT

CROSS-REFERENCE TO RELATED APPLICATIONS

(CLAIMING BENEFIT UNDER 35 U.S.C. 120)

The related applications, U.S. patent application Ser. Nos. 09/838,377 and 09/838,376 (to be amended to include serial numbers when it has been assigned), filed on Apr. 19, 2001, and Apr. 19, 2001, respectively, both by Steven Edward Atkin are hereby incorporated in their entireties, including figures.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

1. Field of the Invention

This invention relates to the arts of text encoding for multiple languages and scripts, and especially to the arts of determining the equivalence of text strings encoded using different sets of code points.

2. Description of the Related Art

Until recently, the World Wide Web (WWW) has been viewed as mainly a display-oriented technology. As the Web is maturing, there is occurring a gradual transition from display-based protocols to pure content-based protocols. These new content-based protocols make full use of Unicode for representing data. This use of Unicode, however, has not made the transition easy.

Historically, the primary purpose of the Web has been to render and display "unidirectional" (left-to-right or right-to-left) data which is sent from a server computer to a browser computer. Initially, this data was based upon traditional single and double byte character encodings.

User expectations and demands, however, have risen. The promise of global e-business has required the Web to adopt richer and more expressive encodings. This need is being addressed by both Unicode and ISO10646, both of which are well known within the art. FIG. 1 presents the well-known Unicode character-control model, including an application layer (10), a control layer (11), a character layer (12), a codepoint layer (13), and a transmission layer (14).

A primary need for metadata in Unicode occurs in the control layer (11), as one may anticipate. In FIG. 1, a dotted line is used to separate the character layer (12) from the control layer (11) to illustrate the sometimes difficult to define boundary separating characters from control. This inability to provide a clean separation has made the task of developing applications (10) that are based on a Unicode more difficult to implement.

Unicode's ability to represent all the major written scripts of the world makes it an ideal candidate for a universal character encoding. Additionally, conversion into and out of Unicode is easy, due to Unicode being a superset of all significant character encodings. In many cases, this has resulted in multiple ways of encoding a given character. These "design points" or "code points" have made the shift to Unicode both rational and straightforward.

Using Unicode primarily as a means for displaying text has worked extremely well thus far. Furthermore, font creators have employed Unicode has a glyph indexing scheme, fostering Unicode's use for display. Moreover, Unicode's ability to combine characters to form composite glyphs have made it possible to render scripts that until now have been given little attention.

The Web, however, is transitioning from simple unidirectional display to full bidirectional interchange. This is evidenced by the move to Extensible Markup Language (XML) and other content based protocols.

In these content-based protocols, the rendering of data is of secondary importance. Application programs that rely on such protocols, such as speech and search engines, place greater importance on the semantic properties of the data rather than its visual appearance or display value.

This transition, nonetheless, presents significant problems for data interchange, since some characters can be represented in multiple ways using different combinations of code points. Unicode's ability to represent semantically equivalent characters in numerous ways has placed a heavy burden on application program and web site content developers. Determining whether two sequences of code points represent equivalent characters or strings has become difficult to ascertain.

Unicode has attempted to solve this problem by defining a "normalization" method for determining whether two sequences of characters are equivalent. This solution, however, has been met with great resistance by industry, largely due to the complexity of the method and its lack of flexible versioning.

The World Wide Web Consortium (W3C) has also offered a solution to this problem. The W3C provides a method for constructing a normalized form of Unicode. This solution also suffers from problems, due to its inability to fully normalize all of Unicode.

Unicode Characters

Instead of encoding just the commonly occurring "accented" characters, known in Unicode as "precomposed" characters, Unicode permits dynamic composition of characters. This enables the construction of new characters by integrating diacritical marks with characters.

A dynamically composed character is fabricated from a base character followed by one or more combining diacritic marks, rendered using either a single composite glyph or a combination of individual glyphs. For example, FIG. 5 shows the two possible ways of representing the latin capital letter "e" with acute. Line 51 shows the character in its precomposed form, while line 52 shows the character in its decomposed form.

Unicode places no limitation on the number of combining characters that may be incorporated with a base character. In certain cases, multiple diacritical marks may interact typographically. For example, consider line 61 on FIG. 6 where the latin small letter "a" is followed by the combining "ring above" and combining "acute". When this occurs, the order of graphic display is strictly determined by the order in which the characters occur in the code points. The diacritics are rendered from the base character's glyph outward. Combining characters that are to be rendered above the base character are stacked vertically, beginning with the first combining character and ending with the last combining character that is rendered above the base character. The rendering of this sequence is shown on line 62 of FIG. 6. The situation is reversed for combining characters that are rendered below a base character.

When a base character is followed by a sequence of diacritic characters that do not typographically interact, Unicode permits some flexibility in the ordering of the diacritical marks. For example, line 71 on FIG. 7 shows latin small letter "c" followed by combining "cedilla" and combining "circumflex". Equivalently, the order of the "cedilla" and the "circumflex" could be reversed, as shown in line 72 of FIG. 7. In either case, the resultant rendering is the same as shown in line 73.

The Unicode standard avoids the encoding of duplicate characters by unifying them within scripts across languages; characters that are equivalent in form are only encoded once. There are, however, characters that are encoded in Unicode that would not have normally been included, because they are variants of existing characters. These characters have been included for purposes of round-trip convertibility with legacy encodings. The prime examples being Arabic contextual forms, ligatures, and other glyph variants.

Additionally, the compatibility area also includes characters that are not variants of characters already encoded., such as Roman numerals. Some more examples of compatibility characters are given on Table 1 in which the class column identifies the type of the compatibility character, the Unicode Character(s) column lists an alternate Unicode character sequence, and the Compatible Character column contains the corresponding compatible character.

TABLE 1

Compatibility characters

| Class | Compatible Character(s) | Unicode Character |
|---|---|---|
| Glyph Variants | L • U004C, U00B7 | L U013F |
| Fullwidth Forms | A U0041 | A UFF21 |
| Vertical Forms | - U2014 | | UFE31 |

Unicode cautions using compatibility characters in character streams, as the replacement of compatibility characters by other characters is irreversible. Additionally, there is a potential loss of semantics when a compatibility character is replaced by another character. For example, when the "L", latin capital letter "l" with middle dot character U013F is replaced with the "L" and " " characters U004C and U00B7, the knowledge that the middle dot should be inside the "L" is lost.

Unicode Normalization

Normalization is the general process used to determine when two or more sequences of characters are equivalent. In this context, the use of the term "equivalent" is unclear, whereas it is possible to interpret the use of "equivalent" in multiple ways. For example, it could mean characters are equivalent when their codepoints are identical, or characters are equivalent when they have indistinguishable visual renderings, or characters are equivalent when they represent the same content.

Unicode supports two broad types of character equivalence, canonical and compatibility. In canonical equivalence, the term "equivalent" means character sequences that exhibit the same visual rendering. For example, the character sequences on lines 71 and 72 of FIG. 7 both produce identical visual renderings, shown on line 73.

In compatibility equivalence, the term "equivalent" is taken to mean characters representing the same content. For example, line 81 of FIG. 8 shows the single "fi" ligature, while line 82 of FIG. 8 shows the compatible two character sequence "f" and "i". In this case, both sequences of characters represent the same semantic content. The only difference between the two sequences is whether or not a ligature is used during rendering.

Unicode defines four specific forms of normalization based upon the general canonical and compatibility equivalencies, summarized in Table 2 in which the title column indicates the name of the normal form, and the category column indicates the equivalence type.

TABLE 2

Normalization forms

| Title | Category | Description |
|---|---|---|
| Normalization Form D (NFD) | Canonical | Canonical Decomposition |
| Normalization Form C (NFC) | Canonical | Canonical Decomposition followed by Canonical Composition |
| Normalization Form KD (NFKD) | Compatibility | Compatibility Decomposition |
| Normalization Form KC (NFKC) | Compatibility | Compatibility Decomposition followed by Canonical Composition |

Normalization form D (NFD) substitutes precomposed characters with their equivalent canonical sequence. Characters that are not precomposed are left as-is. Diacritics (combining characters), however are subject to potential reordering. This reordering only occurs when sequences of diacritics that do not interact typographically are encountered, those that do interact are left alone.

In Unicode, each character is assigned to a combining class. Non-combining characters are assigned the value zero, while combining characters are assigned a positive integer value. The reordering of combining characters operates according to the following three steps:

1. Lookup the combining class for each character.
2. For each pair of adjacent characters AB, if the combining class of B is not zero and the combining class of A is greater than the combining class of B, swap the characters.
3. Repeat step 2 until no more exchanges can be made.

After all of the precomposed characters are replaced by their canonical equivalents and all non-interacting combining characters have been reordered, the sequence is then said to be in NFD.

Normalization form C (NFC) uses precomposed characters where possible, maintaining the distinction between characters that are compatibility equivalents. Most sequences of Unicode characters are already in NFC. To convert a sequence of characters into NFC, the sequence is first placed into NFD. Each character is then examined to see if it should be replaced by a precomposed character. If the character can be combined with the last character whose combining class was zero, then the sequence is replaced with the appropriate precomposed character. After all of the diacritics that can be combined with base characters are replaced by precomposed characters, the sequence is said to be in NFC.

Normalization form KD (NFKD) replaces precomposed characters by sequences of combining characters and also replaces those characters that have compatibility mappings. In this normal form, formatting distinctions may be lost. Additionally, the ability to perform round trip conversion with legacy character encodings may become problematic because of the loss of formatting. NFKC replaces sequences of combining characters with their precomposed forms while also replacing characters that have compatibility mappings.

Further, there are some characters encoded in Unicode that possibly need to be ignored during normalization. In particular, the bidirectional controls, the zero width joiner and non-joiner. These characters are used as format effectors. Specifically, the joiners can be used to promote or inhibit the formation of ligatures. Unfortunately, Unicode does not provide definitive guidance as to when these characters can be safely ignored in normalization. Unicode only states these characters should be filtered out before storing or comparing programming language identifiers, there is no other reference other than this.

To assist in the construction of the normal forms, Unicode maintains a data file listing each Unicode character along with any equivalent canonical or compatible mappings. Processes that wish to perform normalization must use this data file. By having all normalization algorithms rely on this data, the normal forms are guaranteed to remain stable over time. If this were not the case, it would be necessary to communicate the version of the normalization algorithm along with the resultant normal form.

The best way to illustrate the use of normal forms is through an example. Consider the general problem of searching for a string. In particular, assume that a text process is searching for the string "flambe". At first this seems trivial, however, Table 3 lists just some of the possible ways in which the string "flambe" could be represented in Unicode.

TABLE 3

The string "flambé"

| # | Code points | Description |
|---|---|---|
| 1 | U0066, U006C, U0051, U006D, U0062, U0054, U0301 | decomposed |
| 2 | U0055, U005C, U0051, U005D, U0062, U00E9 | precomposed |
| 3 | UFB02, U0061, U005D, U0062, U00E9 | fl ligature, precomposed |
| 4 | UFB02, U0061, U005D, U0062, U0065, U0301 | fl ligature, precomposed |
| 5 | UFF46, UFF4C, UFF41, UFF4D, UFF42, U00E9 | full width, precomposed |
| 6 | UFB02, UFF41, UFF4D, UFF42, U00E9 | fl ligature, full width, precomposed |
| 7 | U0066, U200C, U006C, U0061, U006D, U0062, U00E9 | ligature suppression, precomposed |
| 8 | U0066, U200C, U006C, U0051, U005D, U0062, U0065, U0301 | ligature suppression precomposed |
| 9 | U0055, U200D, U006C, U0061, U006D, U0062, U00E9 | ligature promotion precomposed |
| 10 | U0066, U200D, U006C, U0061, U006D, U0062, U0065, U0301 | ligature promotion, decomposed |
| 11 | U202A, U0066, U006C, U0061, U006D, U0062, U00E9, U202C | left to right segment, precomposed |
| 12 | UFF45, U200C, UFF4C, UFF41, Uff4D, UFF42, U00E9 | full width, ligature promotion, precomposed |
| 13 | UFF45, U200D, UFF4C, UFF41, Uff4D, UFF42, U00E9 | full width, ligature suppression, precomposed |

The character sequences found in Table 3 are all equivalent when transformed into either NKFC or NKFD. In the case of NFKD, all transformations yield the sequence found on row #1 of Table 3, while transformations into NFKC result in the sequence on row #2 of Table 3.

To further demonstrate this, consider the conversion of Line 91 of FIG. 9 copied from row #6 of Table 3 into NFKD. First, the sequence is converted to NFD by replacing precomposed characters with their decomposed equivalents, with the result as shown on line 92 FIG. 9. Second, all characters that have compatibility mappings are then replaced by their corresponding compatibility characters, resulting in the code points shown in line 93 of FIG. 9. The final sequence obtained is the same as the one found on row #1 of Table 3.

The fact that all of the sequences found in Table 3 are equivalent when represented in NFKD is not necessarily true when the sequences are represented in other normal forms. For example, consider line 101 of FIG. 10 copied from row #3 in Table 3. When this sequence is converted to NFD, the result is line 102 of FIG. 10. This does not match the sequence on row #1 of Table 3, hence they are not equivalent.

This situation presents problems for general searching and pattern matching. Without a single normalization form, it is not possible to determine reliably whether or not whether two strings are identical or "equivalent". The W3C has advocated adopting Unicode's NFC for use on the web. Additionally, W3C recommends that normalization be performed early (by the sender) rather than late (by the recipient). Their recommendation is to be conservative in what you send, while being liberal in what you accept. The major arguments for taking this approach are:

(1) almost all data on the web is already in NFC;
(2) most receiving components assume early normalization; and
(3) not all components that perform string matching can be expected to do normalization.

There are some problems with this strategy, however. It assumes that the primary purpose of normalization is to determine whether two sequences have identical renderings. In Unicode's NFC, any and all formatting information is retained. This causes problems for those processes that require comparisons to be based only upon raw content, specifically web search engines and web based databases. Additionally, it places undue limitations on the characters that can be used during interchange.

Therefore there is a need in the art for a system and method for normalizing encoded text data such as Unicode data. This new system and method should be capable of normalizing all text within a given text encoding scheme or standard, while at the same time not being bound to any specific version of the encoding standard.

BRIEF DESCRIPTION OF THE DRAWINGS

The following detailed description when taken in conjunction with the figures presented herein provide a complete disclosure of the invention.

FIG. 5 provides an example of dynamic character composition.

FIG. 6 provides an illustration of combined multiple diacritic characters.

FIG. 7 illustrates non-interacting diacritics.

FIG. 8 provides an example for discussion of compatibility equivalence.

FIG. 9 illustrates conversion of text to NFKD.

FIG. 10 pertains to conversion of text to NFD.

FIG. 11 shows codepoints for the created question exclamation character in Unicode.

FIG. 12 illustrates a representation of the Unicode question exclamation character using metadata.

SUMMARY OF THE INVENTION

A the present invention provides a system and method for normalizing encoded text data such as Unicode which is extensible without use of character definition tables through the use of metadata tagging. The invention provides an open and extendible protocol for describing the semantics of encoded characters, especially Unicode.

According to the method of the invention, metadata characters are used to express higher order protocols and have no effect on the interpretation of the raw data. As such, normalization is greatly simplified wherein data characters in two streams are compared and metadata characters are ignored. This is possible because metadata characters do not play any role in determining content.

Additionally, the adoption of the new text framework promotes the deprecation of characters that convey more than raw content. In particular, ligatures, glyph variants, and half width forms. These types of characters have been present in Unicode solely for legacy codepage conversion. By using the new framework, Unicode never has to compromise their design philosophy. The only characters that ever get added to Unicode are those that express only raw content.

The new architecture realigns Unicode towards content and away from control and glyphs. This refocusing permits the removal of extraneous characters while still retaining the ability to easily convert between various coded character sets.

DETAILED DESCRIPTION OF THE INVENTION

Figure 1:
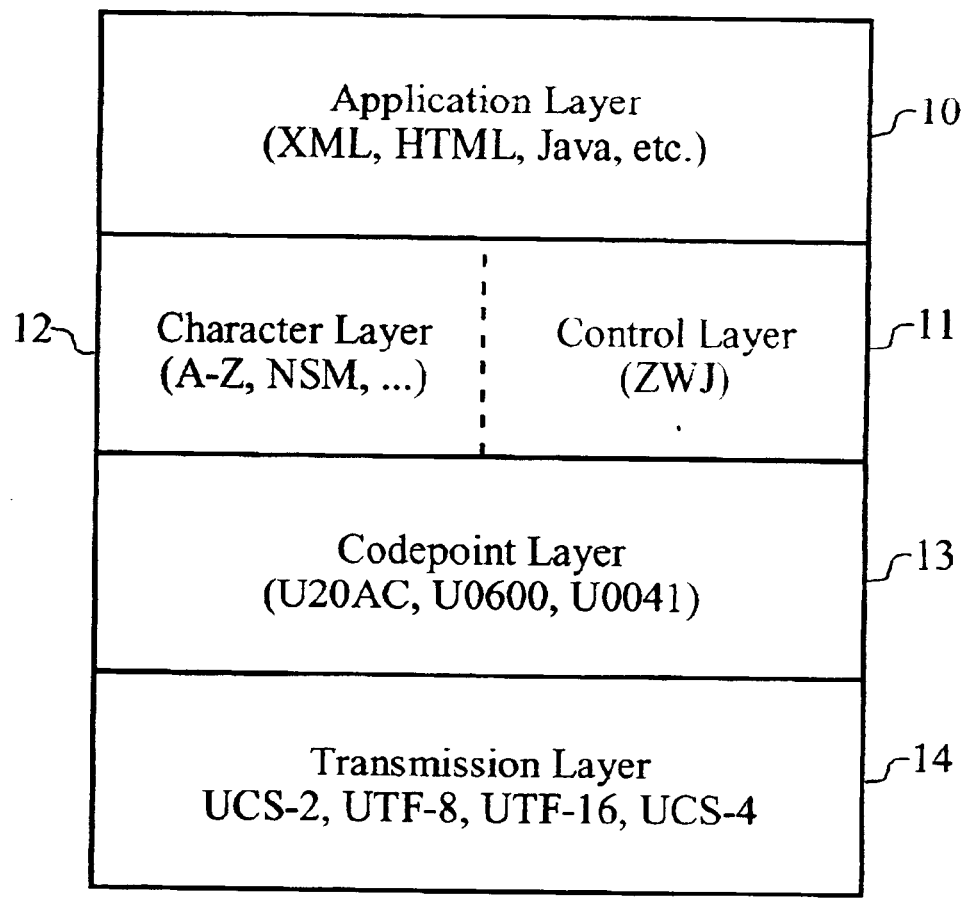
FIG. 1 shows the layered organization of Unicode.
Figure 2:
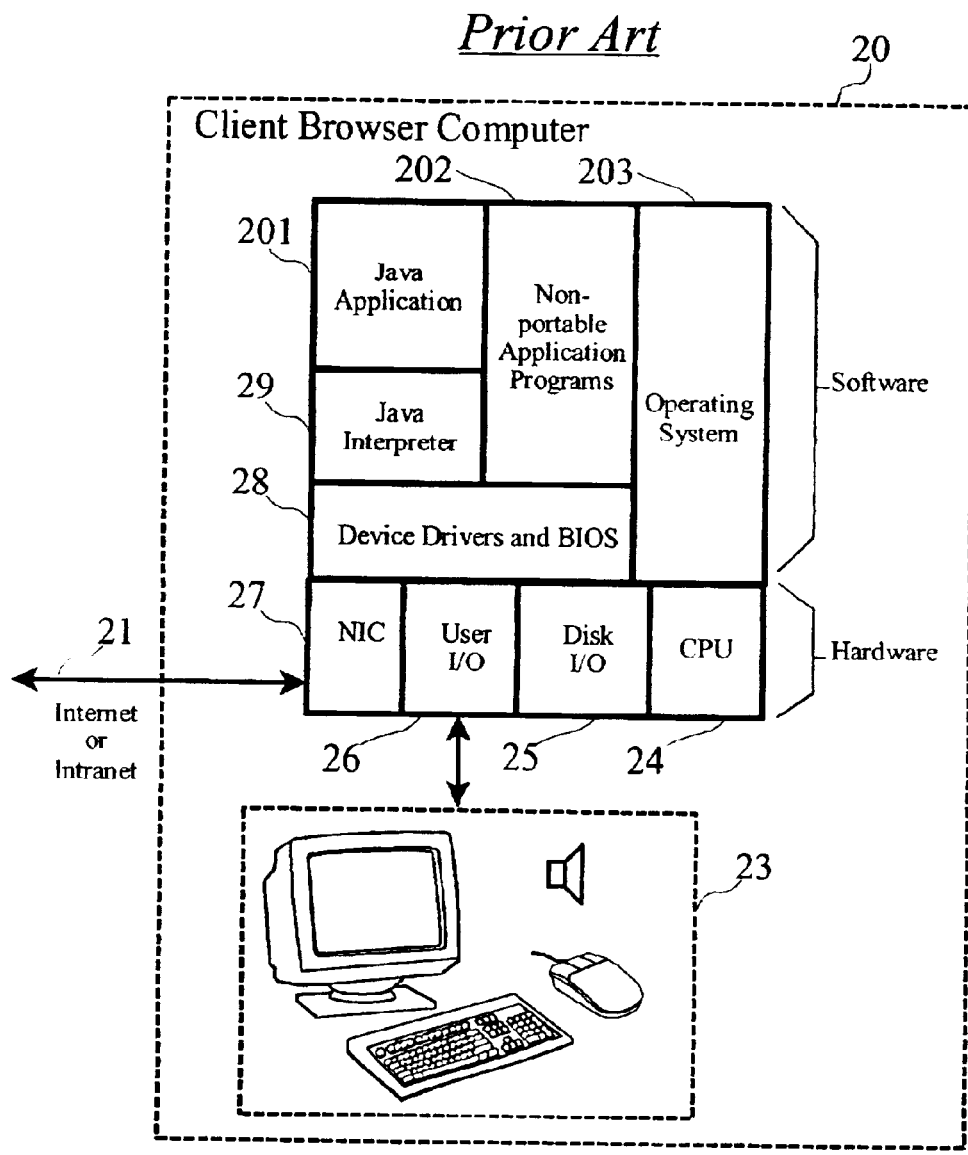
FIG. 2 illustrates the well-known organization of hardware computing platforms capable of executing Java programs or applets.

According to the preferred embodiment, the present invention is realized as a process performed by software on a computer such as a web server computer or a web browsing computer, as shown in FIG. 2. The computer platform (20) has a central processing unit (CPU) (24), a set of device drivers and a basic input/output system (BIOS) (28), and typically an operating system (203), such as IBM's AIX[™], Microsoft's Windows[™], UNIX or Linux.

Most computer platforms, such as a personal computer, are also equipped with disk interfaces (25) and disks; user device I/O (26) to interface to keyboards, pointing devices, and a display; and a network interface card or device (27) allowing communications to a computer network, wireless network, or the Internet.

Some computer platforms, such as personal digital assistants, web-enabled telephones, and Internet appliances may not be provided with all of these components, but in general, the functionality of these components is present in some form.

The computer platform (20) is also typically provided with one or more non-portable, machine-specific application programs (202).

According to the preferred embodiment, the computer platform is provided with a Java interpreter (201), which are freely available for a variety of operating systems and computer platform, and which are well-known in the art.

Figure 3:
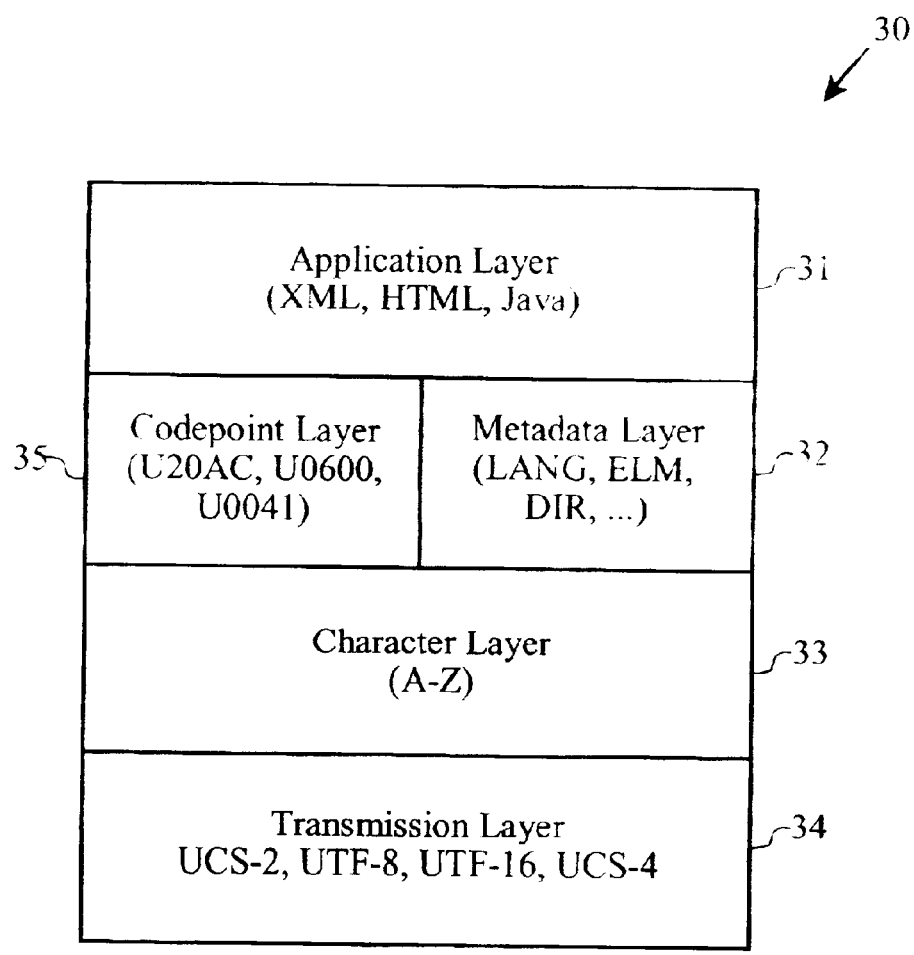
FIG. 3 sets forth the layered organization of the meta tagged text encoding scheme.

Further according to the preferred embodiment, the text encoding scheme used is an enhanced Unicode architecture, as disclosed in the related patent application and illustrated in FIG. 3. The new layered organization (30) includes an application layer (31), a character layer (35), a metadata layer (32), a codepoint layer (33), and a transmission layer (34). Unlike the general Unicode model, this new model provides for a distinctly separate character layer (35) and metadata layer (32) through the use of metadata embedded in Unicode data, resolving the otherwise ambiguous definition of character and control codes.

The remaining disclosure of the present invention relates to the method to be implemented in suitable software, such as a Java applet or servlet.

The new method, called "Meta Normalization" has a primary purpose of determining whether or not two sequences of characters represent the same content, a definition which is closely aligned with Unicode's goals, and in particular, the goal of separating characters from glyphs. The Meta Normalization process is not be concerned with how particular characters are visually rendered, as this is the function of rendering engines. Rather, the Meta Normalization process is useful for searching and comparison for content of documents and data.

The problem with using this definition is that it does not retain higher order semantic information. Ideally, we would like to use Unicode's NFKD or NFKC without losing formatting or other semantic information. The NFKD and NFKC normal forms are the most general of the normal forms. They deal solely with content, which is more fundamentally tied to searching and character comparison.

What is needed is a mechanism for communicating higher order character semantics while not interfering with the process of normalization. The mechanism that will be used to achieve this builds upon Unicode metadata. This use of metadata greatly simplifies the process of normalization.

In this new form of normalization, known as Normal Form Meta Decomposed (NFMD) and Normal Form Meta Precomposed (NFMC), metadata can be ignored during character comparisons. It is safe to exclude the metadata, because it is not part of the raw content. Metadata only describes information related to higher order control, such as formatting and display.

The NFMD and NFMC are easily detectable and fully reversible. Text processes still retain the ability to use whichever local encoding is most appropriate for the task at hand. In these two new meta normal forms, all Unicode characters are directly mappable, and there is no limitation on which characters can and can not be used.

Additionally, these new meta formal forms only need to be used when text processes wish to interchange text or determine when sequences are identical. This approach allows text components to be both liberal in what they send and receive.

Metadata Tags

The following examples demonstrate some of the most frequently occurring situations in which a metadata tag will be used according to the present invention, some of which are listed in Table 4. Each entry in Table 4 specifies a specific Unicode semantic construct and its associated metadata tag.

Throughout this disclosure, metadata tag characters are represented enclosed in square brackets "[" and "]". Additionally, the vertical bar "|" is used to indicate a tag separator, the equals sign "=" denotes a tag argument delimiter, and the tilde "~" depicts a tag cancel character.

TABLE 4

Metadata Tags

| Semantic Construct | Metadata Tag |
| --- | --- |
| Ligatures | [ELM]=[LIG]xy~[ELM] |
| Glyph Variant | [ELM]=[FNT]sy~[ELM] |
| Non Breaking | [ELM]=[NBR]xy~[ELM] |
| Initial Form | [ELM]=[INI]xy~[ELM] |
| Medial Form | [ELM]=[MED]xy~[ELM] |
| Final Form | [ELM]=[FIN]xy~[ELM] |

TABLE 4-continued

Metadata Tags

| Semantic Construct | Metadata Tag |
| --- | --- |
| Isolated Form | [ELM]=[ISO]xy~[ELM] |
| Circle | [ELM]=[CIR]xy~[ELM] |
| Superscript | [ELM]=[SUP]xy~[ELM] |
| Subscript | [ELM]=[SUB]xy~[ELM] |
| Vertical | [ELM]=[VER]xy~[ELM] |
| Wide | [ELM]=[WID]xy~[ELM] |
| Narrow | [ELM]=[NAR]xy-[ELM] |
| Small | [ELM]=[SMA]xy-[ELM] |
| Square | [ELM]=[SQU]xy-[ELM] |
| Fraction | [ELM]=[FRA]xy-[ELM] |

Sample Metadata Tags

The first example revisits the problem of expressing the string "flambe", as set forth in Table 3. Previously, we concluded that all the entries in Table 3 were equivalent from a content perspective.

Table 5 captures the same semantics as was expressed in Table 3 using the new Metadata tags. To enhance comprehension of the Table 5, where possible, the printed version of the characters rather than their codepoint values are given, including only precomposed forms. Generally, it is unnecessary to use decomposed characters, because in most cases there is an equivalent precomposed form. We refer to the strings in Table 5 as being in NFMC.

TABLE 5

The string "flambé" using metadata tags

| # | String | Description |
| --- | --- | --- |
| 1 | flambé | precomposed |
| 2 | [ELM]=[LIG]fl~ELMambé | fl ligature, precomposed |
| 3 | [ELM]=[WID]flambé~[ELM] | full width, precomposed |
| 4 | [ELM]=[WID]|[ELM]=fl~ELMambé~[ELM] | fl ligature, full width, precomposed |
| 5 | [DIR]=[L]flambé~[DIR] | left to right segment, precomposed |

It is possible to convert the NFMC data in Table 5 into NFMD. In this example, the accented "e" represented using the two character sequence "e'" When data in NFMC and NFMD are compared, the data in NFMC must first be converted into NFMD. Fortunately, there are few cases in which it becomes necessary to do this (use of Arabic or Hebrew vowel marks). Using these meta normal forms (e.g. NFMC and NFMD), however, greatly simplifies the normalization process and enables the transmission of data without a loss of semantics.

Meta Normalization Method

The Meta Normalization method for determining whether two strings represent the same content is divided into two phases: meta normal form conversion and content equivalence determination. The conversion phase is only performed when the two strings to be evaluated are not in the same meta normal form. If the strings are not in the same meta normal form, then one of them must be converted into the normal form of the other.

In the content equivalence determination phase, the characters in each string are compared to each other. If a string contains a metadata character, that character is ignored for purposes of equivalence comparison. The remaining characters represent the pure content. The use of "pure" in this context refers to characters without any particular glyph representation.

Additionally, this style of normalization reduces dependencies on external tables, thereby eliminating any potential data table versioning problems. For example, consider the Unicode character U2048, known as "question exclamation mark ?!", as shown on line 1101 of FIG. 11. The purpose of this character is to produce a special glyph variant of a question mark "?" combined with an exclamation mark "!" for use in vertical writing systems, as shown on line 1102 of FIG. 11. Nonetheless, the meaning of the question exclamation mark is the same as the combined individual characters.

The addition of this character required Unicode to update their normalization tables. Nevertheless, when applications based on earlier versions of Unicode performed normalization, the question exclamation mark would not match the individual question mark and exclamation mark. Therefore, these characters would be incompatible. As such, this was a disadvantage of the Unicode normalization process in that it relies upon tables for its evaluation, a characteristic not found in the present invention.

Using the metadata tags and the Meta Normalization Algorithm, no such dependency on a specific version of Unicode is necessary. In fact, a new codepoint definition would not be required at all. This vertical form using metadata is illustrated on line 1202 of FIG. 12. When line 1202 is normalized and then compared to line 1201, the process finds the two representations are equivalent in content.

Continuing with this example of the advantage of the present invention, if at some later time it becomes necessary to add a wide form of the question exclamation mark to Unicode, all that must be done is to surround the "?" and "!" with a metadata tag, as shown in line 1203 of FIG. 12. Thus, the metadata tag mechanism is both open and flexible, allowing content generators (not receivers) to simply add new characters to their content.

Figure 4:
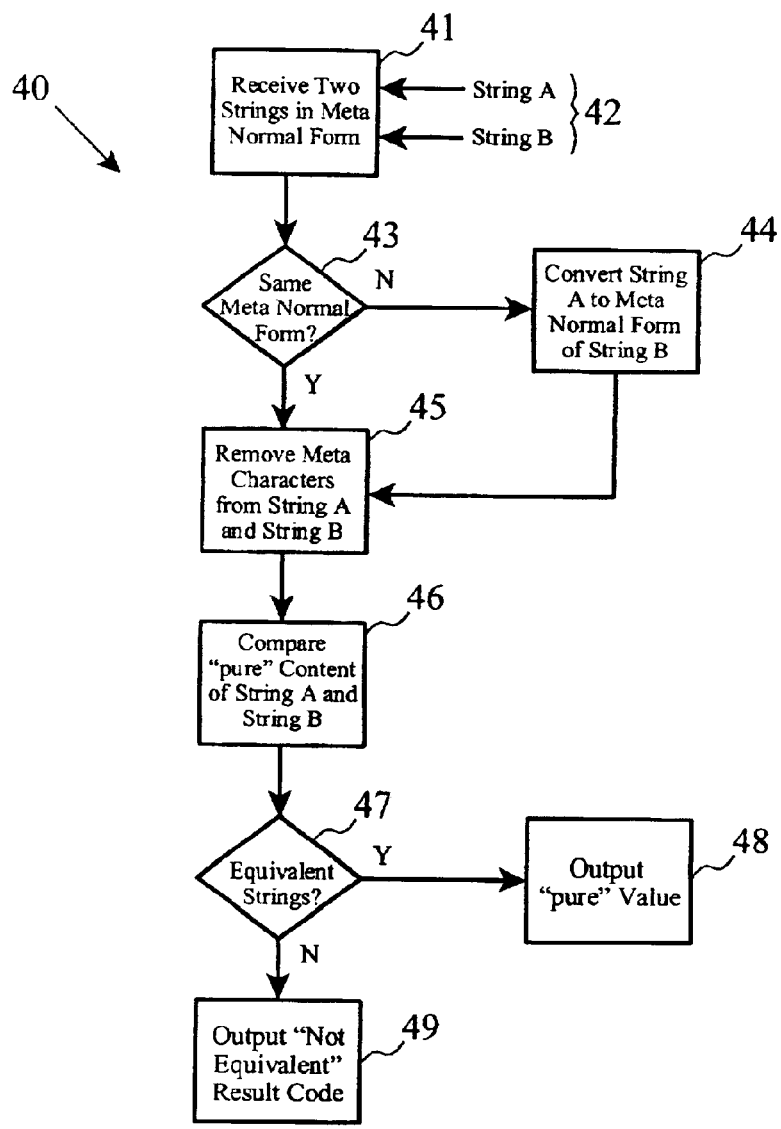
FIG. 4 depicts the logical process of the present invention.

Turning to FIG. 4, the logical process (40) of the Meta Normalization method is shown. Two metadata encoded text strings (42) are received (41) for determination whether they are equivalent in content or not. They are checked (43) to see if they are in the same meta normal form, e.g. either Normal Form Meta Decomposed (NFMD) or Normal Form Meta Precomposed (NFMC) meta normal form. If they are not in the same meta normal form (e.g. if at least one string is in NFMD and at least one string is in NFMC), then one string is selected and converted (44) to the meta normal form of the other string.

Once both strings are in the same meta normal form, the meta characters from both strings are preferably removed yielding strings of "pure" content, e.g. having no glyph representations in them. Then, the two "pure" strings are compared (46) on a character-by-character basis.

If the character-by-character comparison is a match (47), then the strings are declared (48) as equivalent, and the "pure" value of both strings is preferably output such as by writing the value to computer-readable memory, a data file, printing the value or displaying it on a computer display.

If the comparison is not a match (47), then the two strings are declared as nonequivalent (49), such as by returning a result code or argument, writing a result code to computer-readable memory or data file, printing the declaration or displaying the declaration on a computer display.

A system and method for normalizing encoded text, and especially Unicode text, has been disclosed and compared to well known methods of normalizing text. It will be readily recognized by those skilled in the art that certain variations and alternative embodiments may be made without departing from the spirit and scope of the invention, including use of alternate computing platforms, programming languages and methodologies. Therefore, the scope of the invention should be determined by the following claims.

What is claimed is:

1. A computer method for normalizing two or more encoded text data strings, said method comprising the steps of:

receiving at least two strings in meta normal form, said strings being expressed as a series of characters and meta data fields, said meta data fields containing glyph information for said characters in said strings;

determining whether all of the strings are in a decomposed meta normal form or a precomposed meta normal form;

responsive to determining that at least one received string is in a different meta normal form from at least one other received string, converting one or more strings to a selected meta normal form such that all strings are in a same decomposed or precomposed meta normal form;

removing said meta data fields from said received and converted strings to yield pure strings devoid of embedded glyph information; and producing a result code indicating that said pure strings are not equivalent if said pure strings do not match by comparing on a character-by-character basis, otherwise outputting said pure string.

2. The method as set forth in claim 1 wherein said step of converting comprises converting at least one string to Normal Form Meta Decomposed form.

3. The method as set forth in claim 1 wherein said step of converting comprises converting at least one string to Normal Form Meta Composed form.

4. The method as set forth in claim 1 wherein said received strings comprise meta normal form encoded Unicode strings.

5. A computer readable medium encoded with software for normalizing two or more text data strings, said software causing a computer to perform the following actions:

receive at least two strings in meta normal form, said strings being expressed as a series of characters and meta data fields, said meta data fields containing glyph information for said characters in said strings;

determine whether all of the strings are in a decomposed meta normal form or a precomposed meta normal form;

responsive to determining that at least one received string is in a different meta normal form from at least one other received string, convert one or more strings to a selected meta normal form such that all strings are in a same decomposed or precomposed meta normal form;

remove said meta data fields from said received and converted strings to yield pure strings devoid of embedded glyph information; and produce a result code indicating that said pure strings are not equivalent if said pure strings do not match by comparing on a character-by-character basis, otherwise outputting said pure string.

6. The computer readable medium as set forth in claim 5 wherein said software for converting one or more strings to a similar meta normal form comprises software for converting at least one string to Normal Form Meta Decomposed form.

7. The computer readable medium as set forth in claim 5 wherein said software for converting one or more strings to a similar meta normal form comprises software for converting at least one string to Normal Form Meta Composed form.

8. The computer readable medium as set forth in claim 5 wherein said received strings comprise meta normal form encoded Unicode strings.

9. A system for normalizing two or more encoded text data strings, said system comprising:

a meta form checker for determining if a plurality of strings in meta normal form are in a decomposed meta normal form or a precomposed meta normal form, said strings being expressed as a series of characters and meta data fields, said meta data fields containing glyph information for said characters in said strings;

a meta form converter for converting one or more strings to a selected meta normal form such that all strings are in a same decomposed or precomposed meta normal form if said meta form checker indicates that at least one string is in a different meta normal form from at least one other string;

a glyph remover for removing said meta data fields from said plurality of strings and converted strings to yield pure strings devoid of embedded glyph information; and an equivalency evaluator for producing a result code indicating that said strings are not equivalent if said pure strings do not match by comparing on a character-by-character basis, otherwise outputting said pure string.

10. The system as set forth in claim 9 wherein said meta form converter is adapted to convert a string to Normal Form Meta Decomposed form.

11. The system as set forth in claim 9 wherein said meta form converter is a adapted to convert a string to Normal Form Meta Composed form.

12. The system as set forth in claim 9 wherein said meta form comparitor is adapted to compare meta normal form encoded Unicode strings.

* * * * *